(12) United States Patent
Kuester et al.

(10) Patent No.: US 12,459,433 B2
(45) Date of Patent: Nov. 4, 2025

(54) COMPACT WINDSHIELD ATTACHMENT SYSTEM

(71) Applicant: GENTEX CORPORATION, Zeeland, MI (US)

(72) Inventors: Ulrich A. Kuester, Spring Lake, MI (US); Bradley L. Busscher, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 594 days.

(21) Appl. No.: 17/893,756

(22) Filed: Aug. 23, 2022

(65) Prior Publication Data

US 2023/0122749 A1    Apr. 20, 2023

Related U.S. Application Data

(60) Provisional application No. 63/235,901, filed on Aug. 23, 2021.

(51) Int. Cl.
*B60R 1/04* (2006.01)
*G02B 7/182* (2021.01)

(52) U.S. Cl.
CPC .............. *B60R 1/04* (2013.01); *G02B 7/182* (2013.01)

(58) Field of Classification Search
CPC ................................. B60R 1/04; G02B 7/182
USPC .......................................... 359/871; 248/549
See application file for complete search history.

(56) References Cited

U.S. PATENT DOCUMENTS

| | | | | | |
|---|---|---|---|---|---|
| 4,948,085 | A | * | 8/1990 | Mittelhauser | B60R 1/04 359/872 |
| 5,058,851 | A | * | 10/1991 | Lawlor | B60R 1/04 248/223.41 |
| 5,377,948 | A | * | 1/1995 | Suman | B60R 1/04 248/549 |
| 5,377,949 | A | * | 1/1995 | Haan | F16M 13/02 248/483 |
| 5,820,097 | A | * | 10/1998 | Spooner | B60R 1/04 248/549 |
| 5,931,440 | A | * | 8/1999 | Miller | B60R 1/04 248/549 |

(Continued)

FOREIGN PATENT DOCUMENTS

| | | |
|---|---|---|
| JP | 2000219083 A | 8/2000 |
| JP | 4095552 B2 | 6/2008 |

(Continued)

OTHER PUBLICATIONS

International Search Report dated Dec. 14, 2022, for corresponding PCT application No. PCT/US2022/041211, 3 pages.

(Continued)

*Primary Examiner* — Ricky D Shafer
(74) *Attorney, Agent, or Firm* — Price Heneveld LLP; Brian James Brewer

(57) ABSTRACT

A mounting apparatus for attaching a rearview assembly to a windshield may comprise a wedge; a mount configured to support the rearview assembly, the mount in contact with the wedge on at least one surface; and a spring comprising two legs with bent surfaces and configured to deflect outward from one another upon installation and having a lobe at the end of each leg, the spring configured to secure the mount to the wedge. The wedge may be configured to support the spring.

16 Claims, 4 Drawing Sheets

(56) References Cited

U.S. PATENT DOCUMENTS

| | | | |
|---|---|---|---|
| 6,540,193 B1 | 4/2003 | Deline | |
| 6,843,575 B2 * | 1/2005 | Wachi | B60R 1/04 |
| | | | 359/872 |
| 9,174,577 B2 * | 11/2015 | Busscher | F16F 1/26 |
| 2001/0013825 A1 * | 8/2001 | DeLine | B60K 35/22 |
| | | | 340/425.5 |
| 2013/0062497 A1 * | 3/2013 | Van Huis | B60R 1/04 |
| | | | 248/479 |
| 2014/0055617 A1 * | 2/2014 | Minikey, Jr. | B60R 11/00 |
| | | | 348/148 |
| 2019/0176701 A1 * | 6/2019 | Kremkow | B60R 1/12 |
| 2019/0176705 A1 * | 6/2019 | DeMaagd | F16B 1/00 |

FOREIGN PATENT DOCUMENTS

| | | |
|---|---|---|
| KR | 1020020015402 A | 2/2002 |
| WO | 03024745 A1 | 3/2003 |

OTHER PUBLICATIONS

Written Opinion dated Dec. 14, 2022, for corresponding PCT application No. PCT/US2022/041211, 5 pages.

* cited by examiner

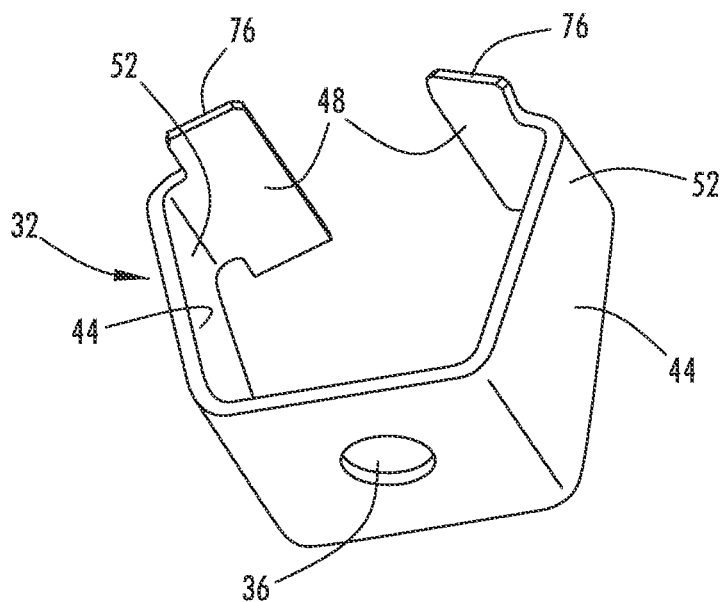
FIG. 3
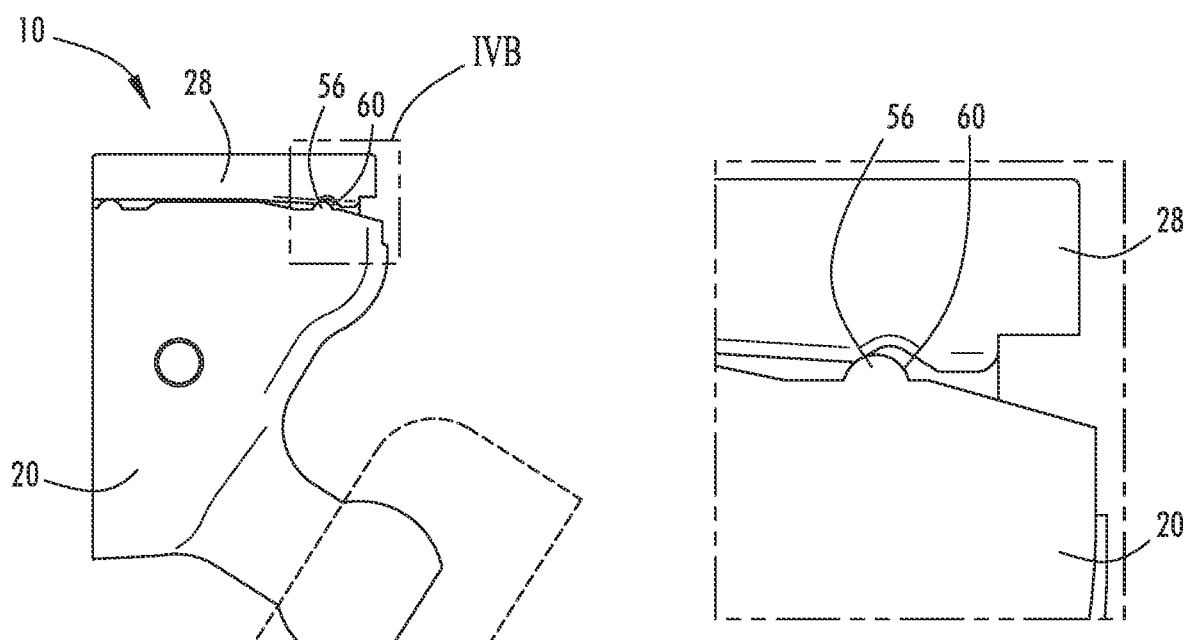
FIG. 4A
FIG. 4B

COMPACT WINDSHIELD ATTACHMENT SYSTEM

CROSS REFERENCE TO RELATED APPLICATIONS

This application claims the benefit of and priority to U.S. Provisional Patent Application No. 63/235,901, filed on Aug. 23, 2021, entitled "Compact Windshield Attachment System," the entire disclosure of which is hereby incorporated herein by reference.

FIELD OF THE DISCLOSURE

This disclosure relates generally to methods and systems for securing rearview assemblies to vehicles, and in particular, to methods and systems for securing rearview assemblies to vehicles using a spring and a mount.

BACKGROUND

A common way of securing a rearview assembly to a vehicle windshield involves attaching a mount of the rearview assembly to a button that has been secured to the windshield. Another common way of securing the rearview assembly to the vehicle windshield involves attaching the mount to an adapter piece and securing the adapter piece to the button.

Additionally, as more features are added to rearview assemblies for vehicles, the rearview assemblies become heavier. The rearview assemblies must be securely fastened to the vehicle, and not at risk of falling or of experiencing excessive vibration due to the extra weight, which could result in a distorted image. In addition, the rearview assemblies must comply with federal regulations regarding detaching from the windshield under certain conditions, such as occupant head impact during a vehicle crash.

SUMMARY

According to an aspect, a mounting apparatus for attaching a rearview assembly to a windshield may comprise a wedge; a mount configured to support the rearview assembly; and a spring. The spring may comprise at least two legs with bent surfaces, the legs configured to deflect outward from one another upon installation. Each leg may have a lobe at a distal end of the leg. The spring may be secured to the mount. The spring may be configured to secure the mount to the wedge, and the mount may be in contact with the wedge on at least one surface.

The spring further may comprise a plurality of legs, each leg having bent surfaces and configured to interface with the wedge. Each leg may comprise a lobe at a distal end of the leg. The lobes may be configured to contact and grip the wedge when the spring may be in an installed position, thereby securing the spring to the wedge. The lobes may be configured to guide the spring and to serve as a ramp for the spring during installation. The mounting apparatus further may comprise a locating feature comprising a protrusion in the mount and an indentation in the wedge, the locating feature being capable of ensuring that the mount may be located properly in the desired location relative to the wedge. Upon being installed and reaching the desired position, the protrusion may be configured to fit into the indentation and to prevent the mount from being pushed beyond the desired location. The legs may be configured to deflect outward upon installation. The spring may be configured to provide good retention between the mount and the wedge. The wedge may be configured to contact the spring at a first surface and to contact the mount as a second surface. Protrusions on a plurality of sides of the mount contact surfaces of the wedge when the mount may be properly positioned. The wedge may be configured to be secured directly to the vehicle windshield. The wedge may be configured to be secured to a button secured to the vehicle windshield.

According to another aspect, a mounting apparatus for attaching a rearview assembly to a windshield may comprise a mount configured to support the rearview assembly, the mount in contact with a button secured to the windshield on at least one surface of the button; and a spring. The spring may comprise at least two legs with bent surfaces, the legs configured to deflect outward from one another upon installation. Each leg may have a lobe at a distal end of the leg. The spring may be secured to the mount. The spring may be configured to secure the mount to the button, and the mount may be in contact with the button on at least one surface

BRIEF DESCRIPTION OF THE DRAWINGS

FIG. 3 illustrates a perspective view of the spring shown in FIG. 1;

FIG. 4A illustrates a side view the mount of FIG. 1;

FIG. 4B illustrates a detail of FIG. 3A;

DETAILED DESCRIPTION

Figure 1:
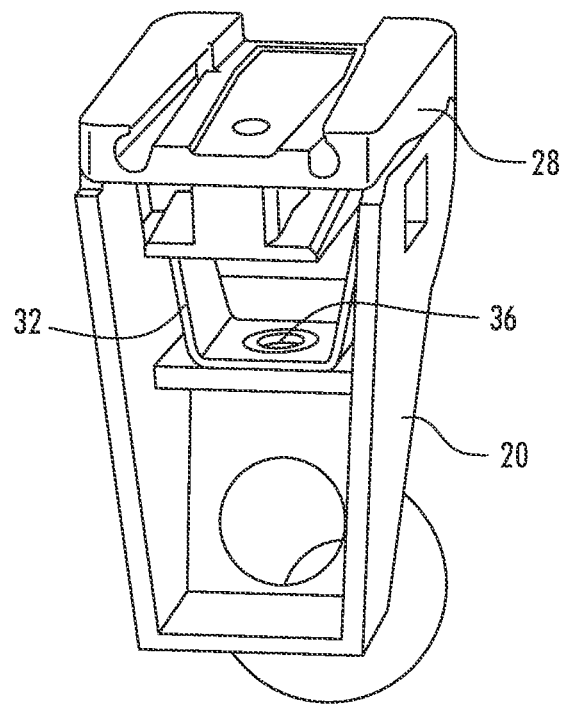
FIG. 1 illustrates a perspective view of a mount and a spring secured to a wedge for a rearview assembly in accordance with this disclosure.
Figure 2:
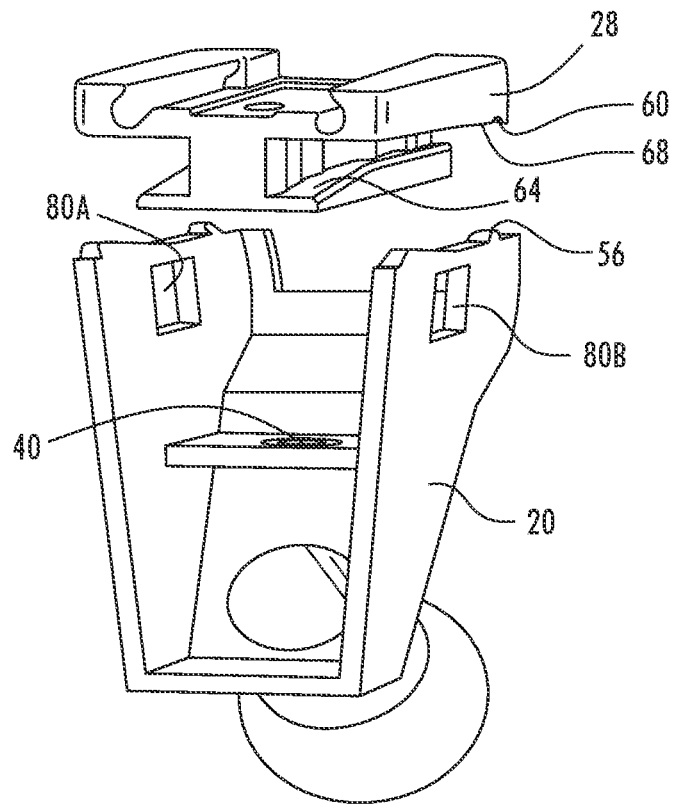
FIG. 2 illustrates a perspective view of the mount and wedge of FIG. 1.

Referring to FIGS. 1 and 2, in some embodiments, a rearview assembly 10 for a vehicle (not shown) may be secured directly to a button on a vehicle windshield or may be secured directly to the vehicle windshield without the use of an adapter piece. A mount for rearview assembly is shown generally at 20. Mount 20 may be configured to support rearview assembly 10. Mount 20 may be configured to be selectively securable to a wedge 28. In some embodiments, wedge 28 may be securable to a windshield button (not shown) affixed to a vehicle windshield. In some embodiments, wedge 28 may be securable directly to windshield. A spring 32 may be capable of securing mount 20 to wedge 28.

Referring now to FIG. 3, spring 32 may define an opening 36 configured to accept a mechanical fastener such as a screw, a rivet, a bolt, or the like (not shown). Mount 20 may define a first opening 40 that, when spring 32 is in position, lines up with opening 36 in spring 32. Spring 32 may be secured to mount 20 by the mechanical fastener.

Spring 32 may comprise two or more legs 44 having bent surfaces, each leg 44 configured to interface with wedge 28. In some embodiments, spring may comprise only two legs. Each leg 44 may have a lobe 48 at a distal end 52 of the leg 44. The lobes 48 may be configured to contact and grip wedge 28 when spring 32 is in position, thereby securing spring 32 to wedge 28. Legs 44 may be designed to deflect outward upon installation. The shape of spring 32 may be optimized to provide good retention between mount 20 and wedge 28 while allowing for detachment under head impact testing and providing improved robustness to tolerance variation. Lobes 48 may function to guide spring 32 during installation and to serve as a ramp for easier spring installation onto wedge 28, thereby avoiding a sharp interface on an edge of spring 32.

As shown in FIGS. 4A and 4B, during installation when mount 20 has reached the desired location relative to wedge 28, a locating feature, comprising a protrusion 56 in mount 20 and an indentation 60 in the wedge 28, may ensure that mount 20 is located properly in a desired location relative to wedge 28. Protrusion 56 may fit into indentation 60, thereby preventing mount 20 from being pushed beyond the desired location. The positioning of protrusion 56 within indentation 60 may also operate to hold mount 20 in place and prevent it from being easily removed from wedge 28.

Wedge 28 may be configured to contact spring 32 at first surface 64 and to contact mount 20 at second surface 68. Protrusions 56 on sides of mount 20 may contact surfaces of wedge 28, and may serve to assist in securing mount 20 to wedge 28. In some embodiments, wedge 28 may be configured to be secured directly to the vehicle windshield, alleviating the necessity of installing a separate button to which wedge 28 may be secured. Wedge 28 may be configured to provide a ramp 72 for easy installation of rearview assembly 10. Spring 32 may be slid up ramp 72 to install rearview assembly 10 on wedge 28. Spring 32 may be secured to mount 20 before spring 32 is installed on wedge 28.

Figure 5A:
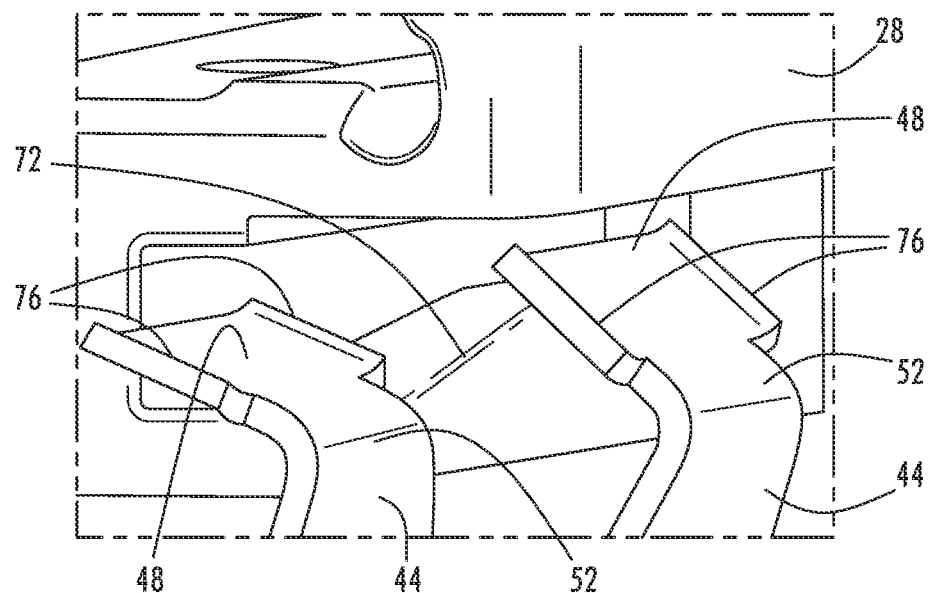
FIG. 5A illustrates a perspective view of the spring moving along a ramp of the wedge.
Figure 5B:
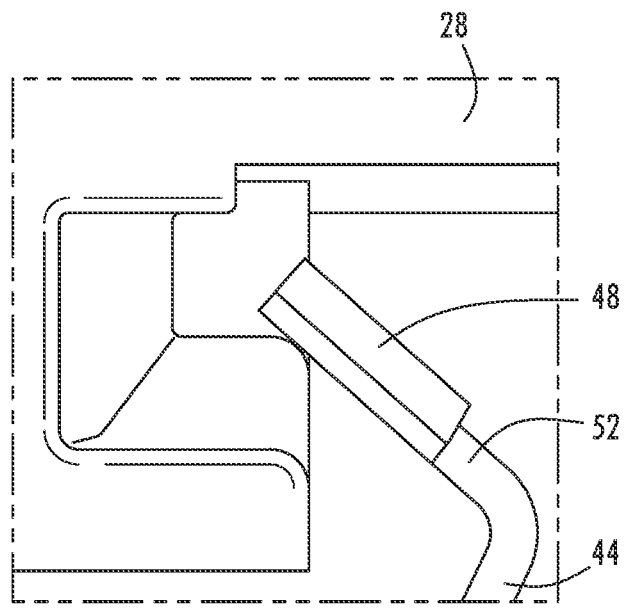
FIG. 5B illustrates a side view of the spring in its final position against wedge.
Figure 6:
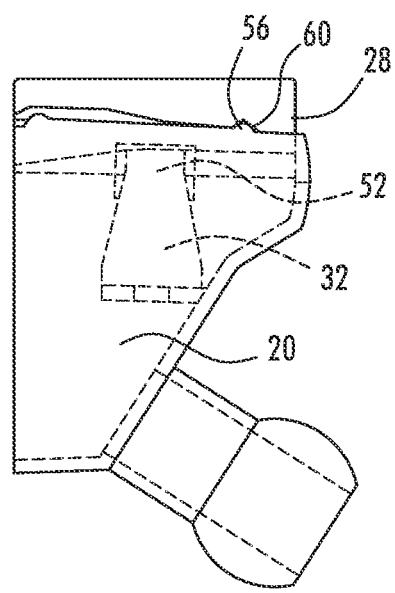
FIG. 6 illustrates a side view of the mount of FIG. 1, showing the spring securing the wedge to the mount.

Upon being moved along ramp 72, spring 32 may be forced into a deformed position, as shown in FIG. 5A to provide clamp force between wedge 28 and mount 20. Upon reaching the desired position, shown in FIG. 5B, lobes 48 of legs 44 of spring 32 may rest on surface of wedge 28 and legs 44 may be at maximum deflection. Mount 20 may interface with wedge 28 on at least one surface. In some embodiments, mount 20 may interface with wedge 28 at four positions, thereby providing stability and lateral retention. In some embodiments, mount 20 may interface with wedge 28 at more than four positions. Legs 44 may be deformed to be forced away from one another. Forcing the legs 44 of spring 32 apart without exceeding the yield strength of the material may provide improved robustness to tolerance variation. A bent ramp 76 on the ends of each lobe 48 may aid in installation. A protrusion in wedge 28 may engage a leading edge of spring 32, thereby preventing overtravel as shown in FIG. 5B As seen in FIG. 6, mount 20 may further define a second pair of openings 80A, 80B. Each of the openings in second pair of openings 80A, 80B may be on each side of mount 20. Each of the openings of the second pair of openings 80A, 80B may be configured to allow a portion of one of the two or more legs 44 to be seen and inspected through the opening 80A, 80B.

Figure 7:
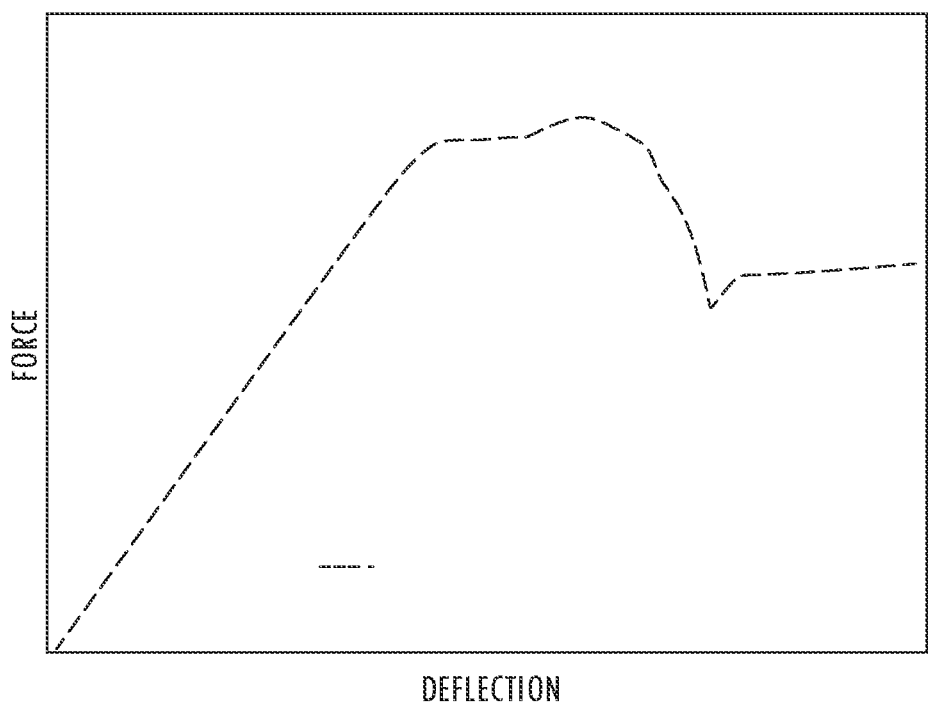
FIG. 7 illustrates a graph showing deflection of legs of the spring relative to force required to detach mount from wedge.

In some embodiments, spring 32 may be manufactured of ASTM 1074 carbon steel. The steel may be about 1.0 mm thick. This thickness may result in better elongation and lower tolerance variation (i.e., better hardening with less deformation) during heat treatment. This may allow spring 32 to be rigid during normal operation while supporting rearview assembly 10. However, during certain conditions, such as a crash or an impact to the vehicle, spring 32 may be configured to, upon pressure being applied to mount 20 or rearview assembly 10, release rearview assembly 10 from windshield. Testing of the force required to detach rearview assembly 10 from wedge 28 as a function of the deflection of legs 44 of spring 32 has shown consistent performance, as shown in FIG. 7. The force required to remove rearview assembly 10 from wedge 28 may be applied to the center of a display element or a reflective element (not shown) disposed within a housing of rearview assembly 10. The testing may be governed by government regulations. Testing of the rigidity of mount 20 by measuring force applied to mount 20 as a function of deflection of mount 20 indicates that mount 20 provides good rigidity.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A mounting apparatus for attaching a rearview assembly to a windshield, comprising:
    a wedge defining a pair of first surfaces and a pair of second surfaces, the first surfaces facing respective ones of the second surfaces and including wedge ramp portions extending toward the second surfaces and flat portions adjacent the wedge ramp portions;
    a mount configured to support the rearview assembly, the mount in contact with the wedge on at least the second surfaces; and
    a spring comprising at least two legs with bent surfaces and configured to deflect outward from one another upon installation and having a lobe at the end of each leg, each lobe having at least one lobe ramp portion engaging with respective ones of the wedge ramp portions during installation, the spring configured to secure the mount to the wedge by engaging the flat portions of the first surfaces;
    wherein the wedge is configured to support the spring.

2. The mounting apparatus of claim 1, wherein the spring further comprises the plurality of legs, each leg having the bent surfaces and configured to interface with the wedge.

3. The mounting apparatus of claim 2, wherein each leg comprises the lobe at a distal end of the leg.

4. The mounting apparatus of claim 3, wherein the lobes are configured to contact and grip the wedge when the spring is in an installed position, securing the spring to the wedge.

5. The mounting apparatus of claim 3, wherein the lobe ramp portions are configured to guide the spring and to serve as a ramp for the spring during installation.

6. The mounting apparatus of claim 1, further comprising a locating feature comprising a protrusion in the mount and an indentation in the wedge, the locating feature being capable of ensuring that the mount is located properly in a desired location relative to the wedge.

7. The mounting apparatus of claim 6, wherein, upon being installed and reaching the desired position, the protrusion is configured to fit into the indentation and to prevent the mount from being pushed beyond the desired location.

8. The mounting apparatus of claim 1, wherein the legs exert an inwardly-directed force on the wedge.

9. The mounting apparatus of claim 1, wherein the spring is configured to provide good retention between the mount and the wedge.

10. The mounting apparatus of claim 1, wherein the wedge is configured to contact the spring at the first surfaces and to contact the mount as the second surfaces.

11. The mounting apparatus of claim 10, wherein protrusions on a plurality of sides of the mount contact surfaces of the wedge when the mount is properly positioned.

12. The mounting apparatus of claim 1, wherein the wedge is configured to be secured directly to a vehicle windshield.

13. A method for securing a rearview assembly to a windshield, comprising: securing a spring to a mount, the spring including at least two legs with bent surfaces and configured to deflect outward from one another upon installation and having a lobe at an end of each leg, each lobe having at least one lobe ramp portion;
    installing the spring on a wedge by alignment of the lobe ramp portions of the spring with ramps defined on respective first surfaces of the wedge;
    sliding the mount such that the lobe ramp portions move over the ramps of the wedge to flat portions adjacent the ramp portions, thereby forcing spring into a deformed position and providing clamping force between the wedge and the mount;
    wherein, upon reaching a desired position, the lobes of the legs of the spring rest on respective ones of the flat portions of the surfaces of the wedge.

14. The mounting apparatus of claim 1, wherein the mount surrounds the spring on at least three sides, the mount defining at least one opening aligned with one of the legs of the spring.

15. The mounting apparatus of claim 14, wherein the mount defines at least two openings respectively aligned with the bent surfaces of respective ones of the at least two legs of the spring.

16. The mounting apparatus of claim 14, wherein the opening is configured such that an installer can inspect a state of engagement between the lobes of the legs with the respective first surfaces of the wedge.

* * * * *